Figure 1:
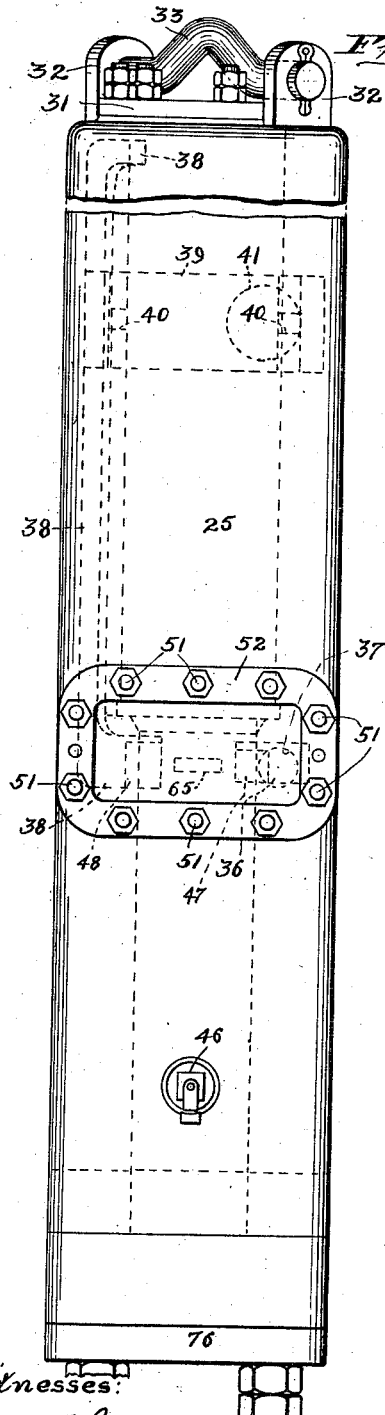

J. N. WARRINGTON.
AUTOMATIC PILE DRIVER.
APPLICATION FILED AUG. 31, 1911.

1,019,386.

Patented Mar. 5, 1912.
4 SHEETS—SHEET 1.

Witnesses:
Chas. E. Gorton
E. Newstrom

Inventor:
James N. Warrington
By Chas. C. Tillman
Atty.

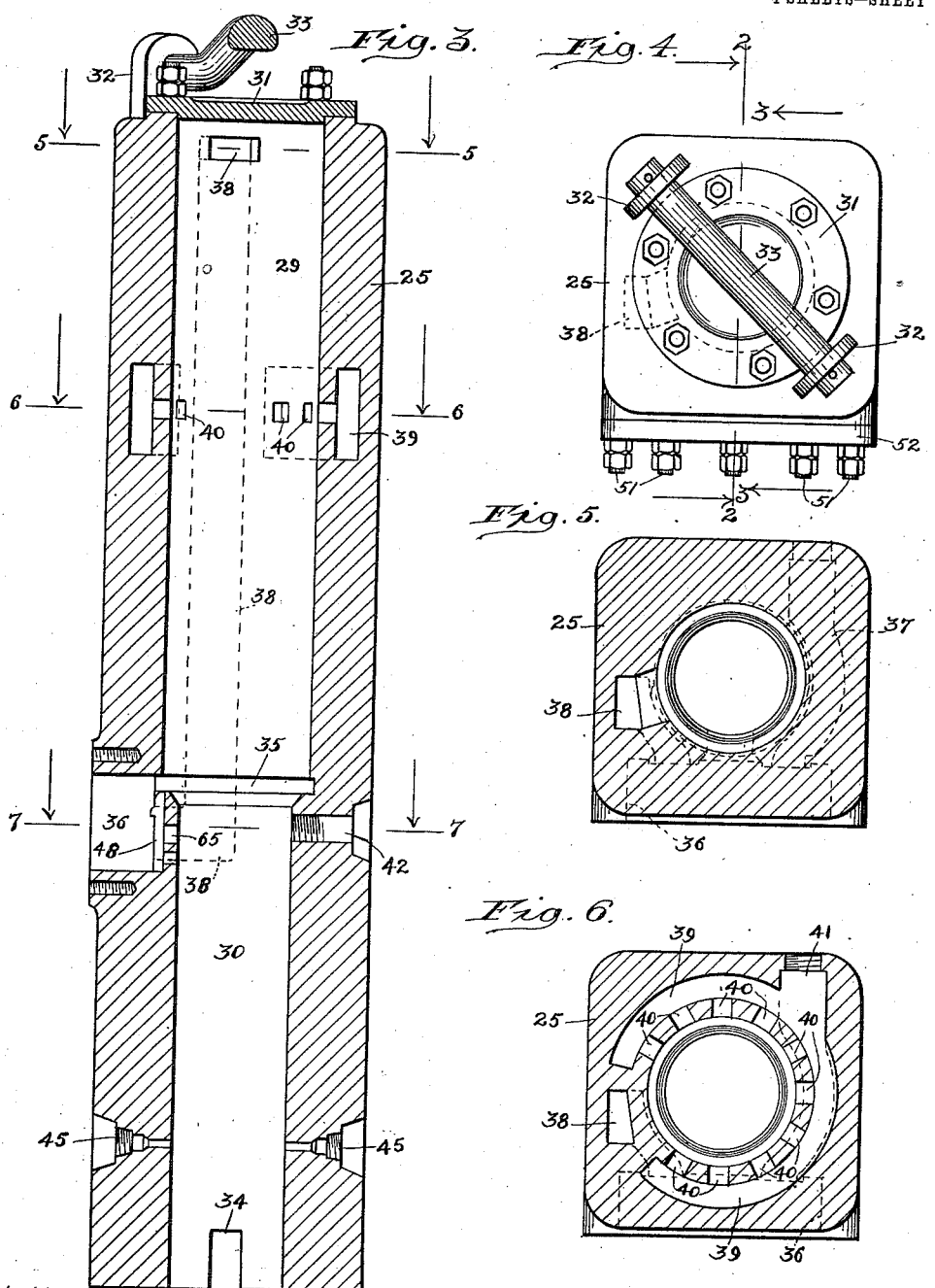

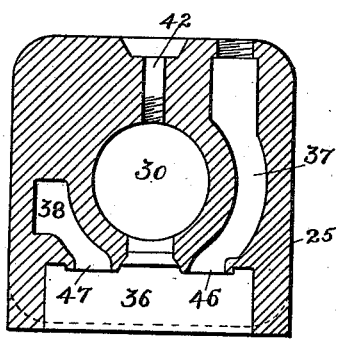
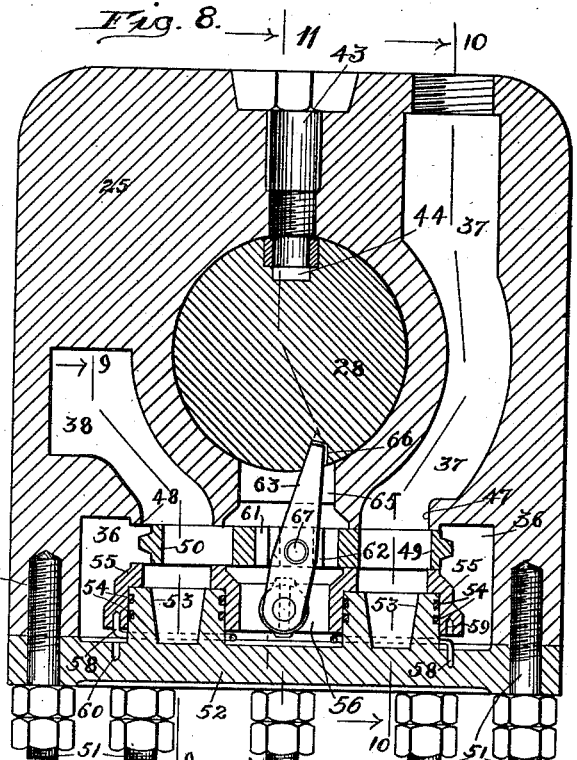
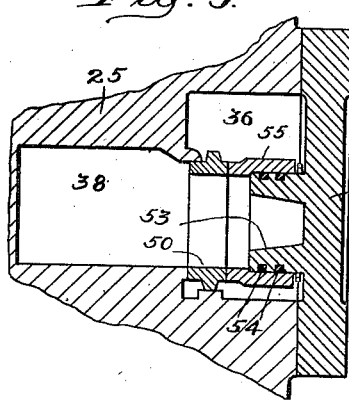
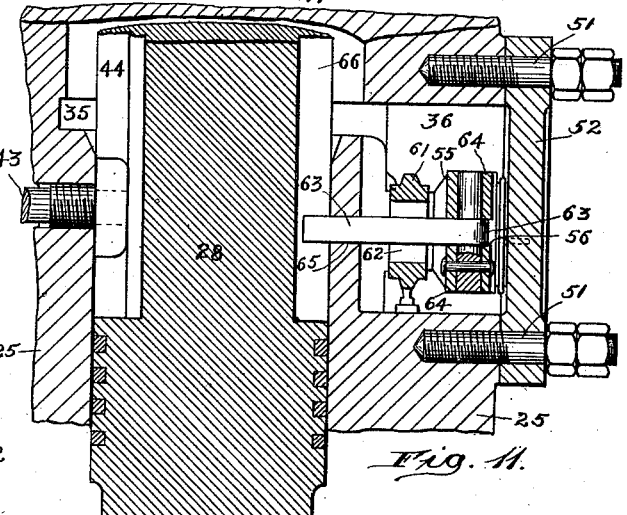
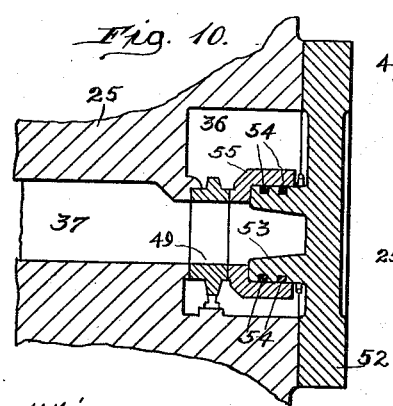

J. N. WARRINGTON.
AUTOMATIC PILE DRIVER.
APPLICATION FILED AUG. 31, 1911.
1,019,386.
Patented Mar. 5, 1912.
4 SHEETS—SHEET 4.
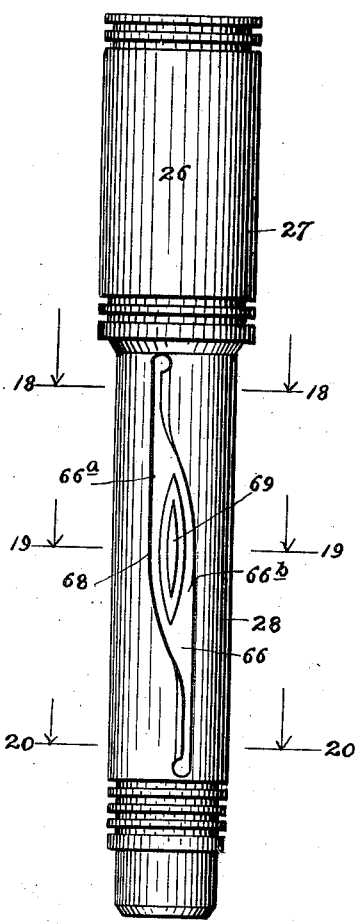
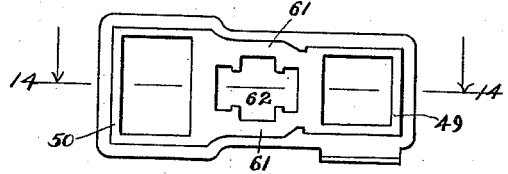
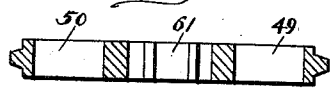
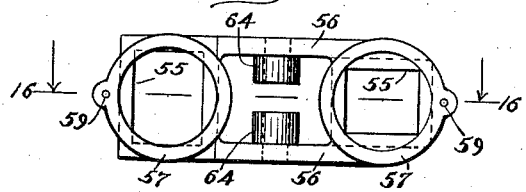
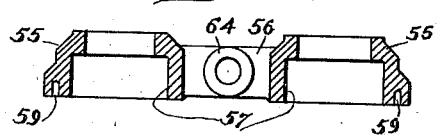
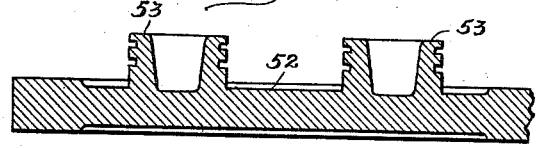
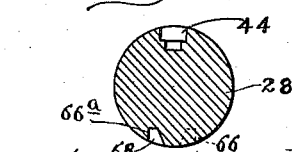
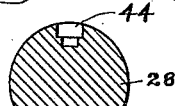
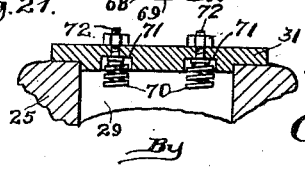
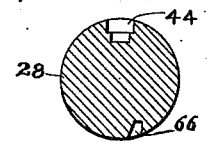
Witnesses:
Chas. E. Gorton.
E. Newstrom
Inventor:
James N. Warrington
By Chas. C. Tillman
Atty.

UNITED STATES PATENT OFFICE.

JAMES N. WARRINGTON, OF LOS ANGELES, CALIFORNIA.

AUTOMATIC PILE-DRIVER.

1,019,386. Specification of Letters Patent. Patented Mar. 5, 1912.

Application filed August 31, 1911. Serial No. 646,959.

*To all whom it may concern:*

Be it known that I, JAMES N. WARRINGTON, a citizen of the United States, residing at Los Angeles, in the county of Los Angeles and State of California, have invented certain new and useful Improvements in Automatic Pile-Drivers, of which the following is a specification.

This invention has relation to that type of pile driving machinery in which the ram or hammer is automatically operated, and while it is herein shown and will be hereinafter described, as being embodied in a steam operated automatic pile driver, in which the ram or hammer thereof, is adapted to be suspended without the use of guiding leaders therefor, yet it will be understood that it is applicable for use on such machines, where leaders or guides are employed for the ram or hammer, and which may be operated by steam or any suitable motive fluid, and it consists in certain peculiarities of the construction, novel arrangement and operation of the various parts thereof, as will be hereinafter more fully set forth and specifically claimed.

The principal object of the invention is to furnish an automatic pile driver, which shall be simple in construction, effective in operation, strong, durable, and with its parts so made and arranged to operate, that great economy in the amount of motive fluid required for its operation will be effected.

Another important object of the invention is, to provide a pile driver in which, by suitable construction, arrangement, and proportioning of the parts, the ratio of the weight of the ram to the weight of the ram-frame or carrier, may be given any desired value, thus permitting the use of heavy stationary parts, *i. e.*, frame or carrier, and light ram in the case of short strokes, and light stationary parts with heavy ram in the case of long strokes, by which means the velocity of impact may be kept practically the same for all lengths of strokes, giving energy to the blow of short stroke rams and avoiding destructive impact in long stroke ones. This advantage is not attainable in pile drivers heretofore made, because the motive fluid, which is admitted alternatively below and above the piston of the hammer, is of the same pressure per square inch in either chamber, and this pressure acting upon the upper cylinder-head, will lift the hammer bodily off the pile, unless the weight of the stationary parts is sufficient to prevent it.

Still another object of the invention is to provide a valve and operating mechanism therefor to control and regulate the passage of motive fluid for operating the driver, which valve and mechanism shall be of such construction, and will so operate as to afford the required port area with a minimum movement of the valve, which movement will be quick, yet without shock, and will be effected with light stress and little wear on the actuating mechanism.

A further object is to provide means in the upper part of the ram-frame or carrier for cushioning the ram in its upward movements or strokes.

Various other objects and advantages of the invention will be disclosed in the subjoined description and explanation.

In order to enable others skilled in the art to which the invention pertains, to make and use the same, I will now proceed to describe it referring to the accompanying drawings, which serve to illustrate an embodiment of the invention, and in which—

Figure 2:
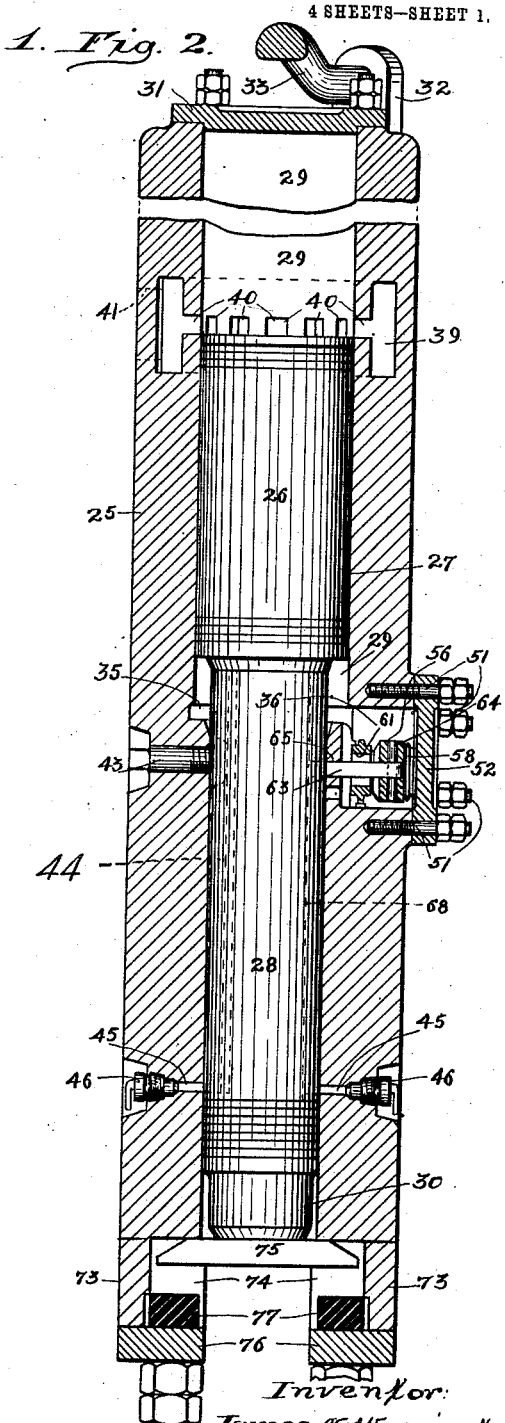

Figure 1, is a view in side elevation of the ram-frame or carrier of a pile driver embodying the invention. Fig. 2, is a central vertical sectional view through the frame or carrier for the ram, taken on line 2, 2, of Fig. 4, looking in the direction indicated by the arrows, showing said frame shortened for the convenience of illustration, and the ram in elevation and in its initial position. Fig. 3, is a similar view taken on line 3, 3, of Fig. 4, looking in the direction indicated by the arrows, with the ram removed. Fig. 4, is a plan view of the frame. Figs. 5, 6, and 7, are plan views taken on lines 5, 5,—6, 6, and 7, 7, respectively of Fig. 3. Fig. 8, is an enlarged plan sectional view of the ram and its frame taken through the valve chest, illustrating the controlling valve and the operating mechanism therefor. Fig. 9, is a fragmental section taken on line 9, 9, of Fig. 8, looking in the direction indicated by the arrows. Figs. 10, and 11, are similar views taken on lines 10, 10, and 11, 11, respectively, of Fig. 8, looking in the direction indicated by the arrows. Fig. 12, is a face view of the ram, showing it detached from its frame. Fig. 13, is a face view of the valve. Fig. 14, is a sectional view thereof taken on line 14, 14, of Fig. 13. Fig. 15, is a face view of the floating or movable valve-seat. Fig. 16, is a sectional view thereof. Fig. 17, is a longitudinal sectional view of the cover for the valve chest. Figs. 18, 19, and 20, are cross-sectional views of the ram, taken on lines 18, 18,—19, 19,—20, 20, respectively, of Fig. 12, and Fig. 21, as a sectional view of the upper portion of the frame or carrier for the ram.

Like numerals of reference refer to corresponding parts throughout the different views of the drawings, in which is shown the ram and frame therefor and operating mechanism for the former, it being deemed unnecessary to illustrate other parts of the pile driving machine as the present invention has no relation to such parts.

The reference numeral 25, designates the ram-frame or carrier, which may be made of any suitable size, form, and material, but by preference rectangular in cross section and provided with a longitudinal bore or cavity for the reception and operation of the ram, which ram is indicated as a whole, by the numeral 26, and preferably consists of a single piece having an enlargement 27, at its upper portion and a reduced portion 28, extending downwardly from said enlarged portion, which portions fit snugly in the enlarged cavity or bore 29, and reduced cavity or bore 30, of the frame 25, but in such a manner as to reciprocate freely therein. The upper portion of the frame 25, is closed by a head 31, and has diametrically disposed upward extensions 32, in suitable openings in which is located a link 33, by means of which the frame 25, may be connected to and suspended from the crane or derrick of the machine, which parts are not shown. The lower portion of the frame 25, is provided with one or more vent openings 34, to permit the escape of compressed air incident to the downward stroke of the ram. At the lower portion of the enlarged cavity or chamber 29, the frame 25, is provided with an annular chamber 35, which communicates with a valve chest 36, formed in the wall of the frame, which chest is horizontally disposed and has leading therefrom near one of its ends, a supply port 37, to which steam or other motive fluid may be supplied in any suitable manner. Leading from the valve chest 36, near its other end, is a port or channel 38, which extends upwardly in the wall of the frame 25, and communicates at its upper end with the larger cavity 29, of said frame near its upper end as is clearly shown in Fig. 3, of the drawings. At a suitable point between the upper end of the port or channel 38, and the valve chest 36, the frame 25, is provided with a circular chamber or channel 39, which communicates with the cavity 29, by means of ports 40, and said circular or belt like channel 39, has leading therefrom an exhaust port 41, for the escape of the motive fluid. In its wall and preferably opposite the valve chest 36, the frame 25, is provided with a screw threaded opening 42, in which is seated a screw bolt 43, which projects at its inner end into a vertical groove 44, formed in the reduced portion 28, of the ram, which arrangement and construction will prevent rotary movement of the ram, yet will permit of reciprocal movement thereof. The groove 44, also affords a passage for the discharge of condensation from the cavities of the ram-frame, and for this purpose the lower portion of the frame 25, is provided with outlet openings 45, one of which communicates with the groove 44, and each of which may be provided with a drain nipple 46, or plug of any suitable construction. The inner wall of the valve-chest 36, is provided at the ports 37, and 38, with valve seats 47, and 48, respectively, which seats, in the present instance, are shown as being rectangular in shape to correspond with similarly shaped valves 49, and 50, but it will be understood that said valves and seats may be of any desired shape.

Secured to the frame 25, by means of suitable bolts 51, is a plate 52, which forms the cover for the valve chest 36, and said plate is provided on its inner surface with a pair of inwardly extended pistons or projections 53, each of which is preferably hollow and is provided externally with packing rings 54, as is clearly shown in Figs. 8, 9, 10, and 17, of the drawings. Movably fitted on each of the pistons 53, is a floating valve seat 55, which are of a corresponding shape to the valves 49, and 50, and in the present instance are shown as being connected together by bars 56, and as being provided on their outer portions with circular sockets 57, to receive the pistons 53, on which they are mounted. Interposed between each of the floating seats 55, and the chest cover 52, is a spring 58, which normally press said seats against the valves 49, and 50, which valves are interposed between the floating seats 55, and the fixed seats 47, and 48, on the ram-frame. The springs 58, may have one of their ends inserted in an opening 59, in the outer portion in each of the seats 55, and its other end in an opening 60, formed on the inner surface of the chest cover as will be readily understood by reference to Fig. 8, of the drawings. As is clearly shown in Fig. 13, the valves 49, and 50, are connected together by means of parts 61, between which is formed an opening 62, for the reception and operation of the valve operating lever 63, which lever has its outer end pivotally connected to bosses or lugs 64, on the inner surfaces of the bars 56, which unite the floating valve seats, and extends through the opening 62, between the valves, and opening 65, leading from the valve chest to the cavity 30, of the frame, and into a cam guideway, formed in the portion 28, of the ram, which guideway is designated as a whole by the reference numeral 66, and will be hereinafter more particularly described. The lever 63, is connected to the duplex valve within the opening 62, thereof by means of a transversely disposed pin 67, in any suitable manner, so that, when the ram is reciprocated an oscillating movement will be imparted to the valves through the medium of the lever 63, by reason of its engagement at its free end with the cam guideway in the ram. This guideway as is clearly shown in Fig. 12, of the drawings, is enlarged between its ends as at 68, and is provided in said enlarged portion with a vertically disposed projection 69, which is outwardly beveled and tapered toward each of its ends, so that, in the downward movement of the ram the projection 69, will pass on one side of the lever 63, while in the upward movement of the ram it will pass on the opposite side of said lever, in which operation it is evident that the movement of the lever as well as the valves which it controls will be moved quickly, without shock, and with light stress and little wear upon the parts.

As is clearly shown in Figs. 1, and 3, of the drawings, the upper end of the channel or port 38, communicates with the cavity 29, of the ram-frame at a slight distance below the head 31, thereof, thus furnishing a space between the upper portion of said opening or port in which steam will be confined on the upward stroke of the ram, thereby affording a cushion for the same. In some instances the head 31, of the frame 25, may have connected to its lower surface one or more coiled springs 70, to act as buffers or cushions for the ram in its upward stroke, and in the present instance, see Fig. 21, the head 31, is provided with sockets 71, into each of which is nested a coiled spring 70, which extend below the surface of the head 31, and may be held in place by means of bolts 72, extended through the head into the recesses 71, so that the spring 70, may be connected to said bolts in any suitable manner. It is obvious that the said springs may be used for cushioning the ram in its upward stroke in conjunction with the steam contained in the chamber 29, above the upper end of the channel or port 38, or if desired, the upper end of the channel 38, may be placed directly under the head 31, and the springs only used, or the springs may be dispensed with and the upper terminus of the channel 38, may be located at a sufficient distance below the head 31, as shown in Fig. 3, to afford a cushion of steam or other motive fluid.

The lower portion of the frame 25, see Fig. 2, is provided with two spaced apart extensions 73, to permit the upper end or head of the pile, not shown, being inserted therebetween, and each of said extensions is provided on its inner surface with a vertically disposed recess 74, in which is movably mounted an impact plate 75, to receive the blows from the ram, and to rest on the upper end or head of the pile. Each of the extensions 73, has secured to its lower end a plate or bar 76, which close the lower ends of the recesses 74, and afford floors or supports for the buffers 77, which may be made of rubber or other suitable resilient material, and suitably held in position within the recesses 74, and on the upper surfaces of the support 76, so as to relieve the frame 25, of some of the strain incident to the strokes of the ram on the impact plate 75, in the operation of guiding the pile.

From the foregoing and by reference to the drawings, it will be readily understood and clearly seen, that, by supplying motive fluid, such as steam, through the supply channel 37, to the valve chest 36, it will pass from thence into the annular space 35, which communicates with said chest, and into the chamber 29, beneath the enlarged portion 27, of the ram, thus causing the latter to be forced upwardly, in which operation it will be understood that the free end of the lever 63, which, when the ram is in its initial position, extends into the upper portion of the cam-guideway 66, will contact with the side wall 66$^a$, of said guideway, and will thereby, in the upward movement of the ram be moved to one side owing to the curve or form of said wall, thus shifting the duplex valve so that its outlet or release port will be fully opened to permit motive fluid to pass into and through the channel or port 38, from the upper end of which it will pass into the enlarged chamber 29, of the frame where it will serve to accelerate the downward stroke of the ram, in which operation a portion of the motive fluid will be exhausted through the openings 40, belt like channel 50, and exhaust or outlet port 41, in the wall of the frame. In the downward movement of the ram, said end of the lever 63, will contact with the wall 66$^b$, of the guideway 66, and by reason of the form or curvature of said wall the said end of the lever 63, will be moved in the opposite direction, thus sliding the valve so as to open the inlet port 37, and to close the outlet port of the valve chest. As is clearly shown in Fig. 12, of the drawings, the beveled and pointed projection 69, is located in the enlarged portion of the cam-guideway 66, in such a manner that its apices are disposed at slight distances from the curved portions of the walls 66$^a$, and 66$^b$, of the cam-guideway. By this arrangement, it is evident that if the ram is moved upwardly or downwardly, a short distance only, in starting the machine, should the inner end of the lever 63, be so positioned in said movements of the ram, when the movement of the latter is reversed, as to be on the opposite side of a vertical line drawn through the ends of the projection 69, from that wall of the guideway in which the lever has been in contact, said projection will cause the lever to move toward the other side wall of the guideway, thus producing positive action of the valve. The exhaust of the motive fluid occurs at the limit of the downward stroke of the ram, and of course some fluid will remain in the enlarged chamber 29, of the frame, which in the next upward stroke of the ram will be augmented by a fresh supply of motive fluid from the valve chest admitted during the upward movement of the ram, which together with the residue fluid will be compressed in the space above the upper end of the channel 38, thus forming a cushion. As the duplex valve, which controls the supply port to and the outlet port from the valve chest is slid back and forth by the reciprocal movement of the ram and the oscillating movement of the operating lever 63, actuated by said ram, it will be understood that the valves 49, and 50, will be alternately seated and unseated between their respective fixed seats and floating seats, and that by reason of said valves opening at their perimeters, when angular in form, or at their peripheries when circular in form, simultaneously, the movement of the valve to give the required port area will be trivial or quite small. It will also be understood that the load on the valve will be governed by the size of the piston on the rear of the floating seat, and this load may therefore be kept comparatively light so that the valve may be moved quickly and with little friction, for it is apparent that on the supply side the greater pressure is within the valve and the area of the port 47, is less than the area of its piston. On the release side the greater pressure is on the outside of the valve and the area of the port 48, is greater than the area of its piston. On the supply side the pressure acting upon the excess of area of the piston over port 47, presses the floating seat against the valve and it in turn against the fixed seat. On the release side the pressure acting upon the excess of area of port 48, over its piston presses the floating seat against the valve and it in turn against the fixed seat.

My invention is herein above set forth as embodied in one particular form of construction, but I do not limit it thereto or to less than all the possible forms in which the invention as hereinafter claimed may be embodied and distinguished from any prior devices for like purpose.

Having thus fully described my invention what I claim as new and desire to secure by Letters-Patent is—

1. In an automatic pile driver, the combination with a ram-frame having a cavity, of a ram mounted in said cavity for reciprocal movement, means for supplying motive fluid to the cavity of the frame whereby said fluid will first act to raise the ram and then at the proper time during the upward movement of the ram will be supplied to a part of the cavity of the frame so as to act to accelerate the downward stroke of the ram, substantially as set forth.

2. In an automatic pile driver, the combination with a ram-frame having a cavity, of a ram mounted in said cavity for reciprocal movement, means for supplying motive fluid to the cavity of the frame whereby said fluid will first act on the ram to raise the same and then at the proper time during the upward movement of the ram will be supplied to the cavity of the frame above a part of the ram to accelerate the downward stroke thereof, substantially as set forth.

3. In an automatic pile driver, the combination with a ram-frame having a cavity, of a ram mounted in said cavity for reciprocal movement, means for supplying motive fluid to the cavity of the frame below a portion of the ram whereby said fluid will first act to raise the ram and then at the proper time during the upward movement of the ram will be supplied to the cavity of the frame above a part of the ram to accelerate the downward stroke thereof, substantially as set forth.

4. In an automatic pile driver, the combination with a ram-frame having a cavity, of a ram mounted in said cavity for reciprocal movement, means for supplying motive fluid to the cavity of the frame below a portion of the ram whereby said fluid will first act to raise the ram and then at the proper time during the upward movement of the ram will be supplied to the cavity of the frame above a part of the ram to accelerate the downward stroke thereof, said frame having means for the exhaust of motive fluid at the end of the downward stroke of the ram, substantially as set forth.

5. In an automatic pile driver, the combination with a ram-frame having a cavity, of a ram mounted in said cavity for reciprocal movement, means for supplying motive fluid to the cavity of the ram below a portion of the ram whereby said fluid will first act to raise the ram and then at the proper time during the upward movement of the ram will be supplied to the cavity of the frame above the ram to accelerate the downward stroke thereof, and means at the upper portion of the frame to cushion the ram in its upward movement, substantially as set forth.

6. In an automatic pile driver, the combination with a ram-frame having a cavity, of a ram mounted in said cavity for reciprocal movement, means for supplying motive fluid to the cavity of the frame below a portion of the ram whereby said fluid will first act to raise the ram, and then at the proper time during the upward movement of the ram will be supplied to the cavity of the frame above the ram to accelerate the downward stroke thereof, said frame having means for the exhaust of motive fluid at the end of the downward stroke of the ram, and means at the upper end of the frame to cushion the ram in its upward movement, substantially as set forth.

7. In an automatic pile driver, the combination with a ram-frame having a cavity enlarged in its upper portion and reduced in its lower portion, of a ram having its upper portion enlarged and its lower portion reduced and mounted within said cavity for reciprocal movement, a valve chest communicating with the lower portion of said cavity and below the enlargement of the ram, said frame having a conduit in communication at its lower end with the valve-chest and at its upper end with the upper portion of said enlarged cavity, said enlarged cavity of said frame having an exhaust outlet between the ends of said conduit, means to supply motive fluid to the valve-chest and to the lower portion of the enlarged cavity of the frame beneath the enlarged portion of the ram for the purpose of raising the latter, and means actuated by the ram to permit the passage of motive fluid from the valve-chest through said conduit to the enlarged cavity above the ram during the upward movement of the latter whereby the motive fluid above the ram will accelerate the downward stroke thereof.

8. In an automatic pile driver, the combination with a ram-frame having a cavity enlarged in its upper portion and reduced in its lower portion, of a ram having its upper portion enlarged and its lower portion reduced and mounted within said cavity for reciprocal movement, a valve-chest communicating with the lower portion of said cavity below the enlargement of the ram, said frame having a conduit in communication at its lower end with the valve-chest and at its upper end with the upper portion of said enlarged cavity at a distance below the head thereof, said enlarged cavity having an exhaust outlet between the ends of said conduit, means to supply motive fluid to the valve-chest, a reciprocating duplex valve adapted to alternately open and close the supply and outlet ports of the valve-chest, an actuating lever engaging said valve and the ram and actuated by the latter to reciprocate the valve whereby the motive fluid to and from the valve-chest will be controlled thereby and said fluid permitted to pass at the proper time through said conduit to the enlarged cavity above the ram during the upward movement of the latter to accelerate the downward stroke thereof.

9. In a pile driver, the combination with a hollow ram-frame, of a ram mounted therein for reciprocal movement, a valve chest on said frame in communication with the cavity thereof and having valve-seated ports for the supply and outlet of motive fluid to and from said chest, a duplex valve reciprocatingly mounted on said seats and having frames of corresponding size and shape with said seats to register therewith, a pair of pistons within the valve-chest opposite said valve seats, a movable valve seat on each of said pistons and in contact with said valve on its surface opposite from the first named valve seats, a lever engaging the ram and said valve for the actuation of the latter by the movement of the ram.

10. In a pile driver, the combination with a hollow ram-frame, of a ram mounted therein for reciprocal movement, a valve chest on said frame in communication with the cavity thereof and having valve-seated ports for the supply and outlet of motive fluid to and from said chest, a conduit in communication at its lower end with said outlet port and at its upper end with the cavity of the frame above the ram, a reciprocal duplex valve on the seats of said ports, a spring pressed movable valve seat on the opposite surface of said valve from each of said valve-seated ports, a lever engaging the valve and ram and adapted for actuation by the movement of the latter to reciprocate the valve.

11. In a pile driver, the combination with a ram-frame, of a ram mounted thereon for reciprocal movement, a valve-chest on said frame and provided with a fixed valve seat, a valve including a frame mounted on said seat for sliding movement, a piston on the valve-chest opposite the fixed seat, a movable valve-seat on said piston and in contact with the opposite surface of the valve from the fixed seat, a lever engaging the valve and ram, and means on the latter to actuate the lever so as to impart reciprocal movement to the valve.

12. In a pile driver, the combination with a hollow ram frame, of a ram mounted therein for reciprocal movement and having a longitudinally disposed cam-guideway, a valve chest on said frame in communication with the cavity thereof and having valve seated ports for the supply and outlet of motive fluid to and from said chest, a conduit in communication at its lower end with said outlet port and at its upper end with the cavity of the frame above the ram, a reciprocal duplex valve on the seats of said ports, a spring pressed movable valve seat on the opposite surface of said valve from each of said seated ports, and a lever engaging the valve and extended at one of its ends into said guideway for actuation thereby to reciprocate the valve.

13. In a pile driver, the combination with a hollow ram frame, of a ram mounted therein for reciprocal movement and having a longitudinally disposed cam-guideway, the side walls of said guideway being oppositely curved between their middle portions and ends, a valve chest on said frame in communication with the cavity thereof and having valve seated ports for the supply and outlet of motive fluid to and from said chest, a conduit in communication at its lower end with said outlet port and at its upper end with the cavity of the frame above the ram, a reciprocal duplex valve on the seats of said ports, a pair of pistons within the valve chest opposite said valve seats, a movable valve seat on each of said pistons and in contact with said valve on its surface opposite from the first named valve seats, and a lever engaging the valve and extended at one of its ends into said guideway for actuation thereby to reciprocate the valve.

14. In a pile driver, the combination with a hollow ram frame, of a ram mounted therein for reciprocal movement and having a longitudinally disposed cam-guideway, the side walls of said guideway being oppositely curved between their middle portions and ends, a projection located between the side walls of said guideway and having pointed ends, a valve chest on said frame in communication with the cavity thereof and having valve seated ports for the supply and outlet of motive fluid to and from said chest, a duplex valve reciprocatingly mounted on said seats and having frames of corresponding size and shapes with said seats to register therewith, a pair of pistons within the valve chest opposite said valve seats, a movable valve seat on each of said pistons and in contact with said valve on its surface opposite from the first named valve seats, and a lever engaging the valve and extended at one of its ends into said guideway for actuation thereby to reciprocate the valve.

15. In a pile driver, the combination with a hollow ram frame, of a ram mounted thereon for reciprocal movement and having a longitudinally disposed cam-guideway, a valve chest on the said frame and provided with a fixed valve seat, a valve including a frame mounted on said seat for sliding movement, a piston on the valve chest opposite the fixed seat, a movable valve seat on said piston and in contact with the opposite surface of the valve from the fixed seat, and a lever engaging the valve and extended at one of its ends into said guideway.

16. The combination with a frame, of a part mounted therein for reciprocal movement and having a longitudinally disposed cam-guideway, a valve chest on said frame and provided with a fixed valve seat, a valve including a frame mounted on said seat for sliding movement, a piston on the valve chest opposite the fixed seat, a movable valve seat on said piston and in contact with the opposite surface of the valve from the fixed seat, and a lever engaging the valve and extended at one of its ends into said guideway.

17. In an automatic pile driver, the combination with a ram-frame having a cavity, of a ram mounted in said cavity for reciprocal movement, means for supplying motive fluid to the cavity of the frame whereby said fluid will first act to raise the ram, means actuated by the upward movement of the ram to shut off at the proper time the supply of motive fluid and simultaneously release the imprisoned fluid to another portion of the cavity of the frame where it will expansively accelerate the downward stroke of the ram.

18. In an automatic pile driver, the combination with a ram-frame having a cavity, of a ram mounted in said cavity for reciprocal movement, means for supplying motive fluid to the cavity of the frame whereby said fluid will first act to raise the ram, means actuated by the upward movement of the ram to shut off at the proper time the supply of motive fluid, and means similarly actuated for releasing the imprisoned fluid into another portion of the cavity of the frame where it will expansively accelerate the downward stroke of the ram.

JAMES N. WARRINGTON.

Witnesses:
   CHAS. C. TILLMAN,
   E. NEWSTROM.